United States Patent
Byun et al.

(10) Patent No.: US 10,958,821 B2
(45) Date of Patent: Mar. 23, 2021

(54) IMAGE CAPTURING DEVICE AND METHOD TO PERFORM AUTOFOCUS

(71) Applicant: HANWHA TECHWIN CO., LTD., Seongnam-Si (KR)

(72) Inventors: Jaewoon Byun, Seongnam-Si (KR); Youngsang Kwon, Seongnam-Si (KR); Daebong Kim, Seongnam-Si (KR); Dongjin Park, Seongnam-Si (KR)

(73) Assignee: HANWHA TECHWIN CO., LTD.

( * ) Notice: Subject to any disclaimer, the term of this patent is extended or adjusted under 35 U.S.C. 154(b) by 0 days.

(21) Appl. No.: 16/665,063

(22) Filed: Oct. 28, 2019

(65) Prior Publication Data

US 2020/0137294 A1 Apr. 30, 2020

(30) Foreign Application Priority Data

Oct. 29, 2018 (KR) ........................ 10-2018-0129516

(51) Int. Cl.
*H04N 5/232* (2006.01)
*G02B 7/36* (2021.01)

(52) U.S. Cl.
CPC ........... *H04N 5/23212* (2013.01); *G02B 7/36* (2013.01)

(58) Field of Classification Search
None
See application file for complete search history.

(56) References Cited

U.S. PATENT DOCUMENTS

| 7,844,172 B1* | 11/2010 | Tsai ................. H04N 5/23212 396/89 |
| 8,294,811 B2 | 10/2012 | Kulkarni |
| 8,422,878 B2* | 4/2013 | Park ................. H04N 5/23212 396/128 |
| 2010/0188558 A1* | 7/2010 | Gamadia ............ H04N 5/23212 348/345 |
| 2015/0346585 A1* | 12/2015 | Sakurabu ............... G02B 7/38 348/224.1 |
| 2018/0217358 A1* | 8/2018 | Tanaka ..................... G02B 7/36 |

FOREIGN PATENT DOCUMENTS

KR   10-2011-0106600   9/2011

* cited by examiner

*Primary Examiner* — James M Hannett
(74) *Attorney, Agent, or Firm* — H.C. Park & Associates, PLC

(57) ABSTRACT

An image capturing device including: a lens; a lens driver configured to change a focus position by moving the lens; an image sensor configured to acquire an image signal from light having passed through the lens; a calculator configured to output a focus value determined by passing the image signal from the image sensor through a frequency filter; and a focus controller configured to control the lens driver to move the lens, based on focus values corresponding to focus positions of the lens. The focus controller may receive one or more focus values from the calculator when the lens is positioned at one or more focus positions among the focus positions, and estimate a focus value of another focus position among the focus positions based on the one or more focus positions and the one or more focus values.

13 Claims, 6 Drawing Sheets

IMAGE CAPTURING DEVICE AND METHOD TO PERFORM AUTOFOCUS

CROSS REFERENCE TO RELATED APPLICATION

This application claims priority from and the benefit of Korean Patent Application No. 10-2018-0129516, filed on Oct. 29, 2018, which is hereby incorporated by reference for all purposes as if fully set forth herein.

BACKGROUND

Field

Exemplary embodiments of the invention relate generally to an electronic device, and more specifically, to an image capturing device and method to perform AF (Autofocus).

Discussion of the Background

With the spread of cameras and various electronic devices which include a camera, users are frequently storing photographs captured by them in multimedia devices, or they otherwise upload the photographs to the web.

The camera may include an AF function for automatically adjusting focus. For the AF function, a contrast detection method, an infrared method, a TTL (Through-The-Lens) method and the like may be used. The contrast detection method calculates signal values from captured image signals, and performs the AF function using the signal values. The contrast detection method is now widely used as a result of the improvement in calculation speed of the camera. However, resources for performing such an AF function in the camera are limited. Therefore, there is a need for a camera capable of providing the AF function at higher speed, using fewer resources.

The above information disclosed in this Background section is only for understanding of the background of the inventive concepts, and, therefore, it may contain information that does not constitute prior art.

SUMMARY

Exemplary embodiments are directed to an image capturing device capable of rapidly performing AF with high reliability, while using reduced resources.

Additional features of the inventive concepts will be set forth in the description which follows, and in part will be apparent from the description, or may be learned by practice of the inventive concepts.

An exemplary embodiment of the invention provides an image capturing device including: a lens; a lens driver configured to change a focus position by moving the lens; an image sensor configured to acquire an image signal from light having passed through the lens; a calculator configured to output a focus value determined by passing the image signal from the image sensor through a frequency filter; and a focus controller configured to control the lens driver to move the lens, based on focus values corresponding to focus positions of the lens. The focus controller receives one or more focus values from the calculator when the lens is positioned at one or more focus positions among the focus positions, and estimates a focus value of another focus position among the focus positions based on the one or more focus positions and the one or more focus values.

The another focus position may be adjacent to the one or more focus positions.

The one or more focus positions may include a first focus position and a second focus position, and the one or more focus values may include a first focus value and a second focus value which correspond to the first and second focus positions, respectively. The focus controller may estimate a third focus value corresponding to a third focus position among the focus positions, based on the first and second focus values.

The first focus position, the third focus position, and the second focus position may be sequentially located.

The focus controller may estimate a fourth focus value corresponding to a fourth focus position among the focus positions based on the third focus value and the second focus value, receive a fifth focus value from the calculator when the lens is located at a fifth focus position among the focus positions, and correct the fourth focus value based on the second focus value and the fifth focus value. The first focus position, the third focus position, the second focus position, the fourth focus position, and the fifth focus position may be sequentially located.

The frequency filter may include a first band pass filter and a second band pass filter, each of the first and second focus values may be determined through the first band pass filter, and the focus controller may receive a fourth focus value from the calculator, the fourth focus value being determined through the second band pass filter when the lens is located at the third focus position.

The focus controller may receive a fifth focus value from the calculator, the fifth focus value being determined through the second band pass filter when the lens is located at a fourth focus position, and estimate a sixth focus value corresponding to the second focus position based on the fourth and fifth focus values.

The first focus position, the third focus position, the second focus position, and the fourth focus position may be sequentially located.

Another exemplary embodiment of the invention provides an image capturing device to perform AF including: a lens; a lens driver configured to change a focus position by moving the lens; an image sensor configured to acquire an image signal from light having passed through the lens; a calculator configured to output a focus value determined by passing the image signal from the image sensor through a frequency filter; and a focus controller configured to control the lens driver to move the lens based on focus values corresponding to focus positions of the lens. The focus controller estimates a third focus value corresponding to a third focus position adjacent to a first focus position and a second focus position, based on a first focus value and a second focus value which are outputted from the calculator, when the lens is located at the first and second focus positions.

The first focus position, the third focus position, and the second focus position may be sequentially located.

The focus controller may estimate a fourth focus value corresponding to a fourth focus position, based on the third focus value and the second focus value. The first focus position, the third focus position, the second focus position, and the fourth focus position may be sequentially located.

The focus controller may receive a fifth focus value from the calculator when the lens is located at a fifth focus position, and correct the estimated fourth focus value based on the second and fifth focus values. The first focus position, the third focus position, the second focus position, the fourth focus position, and the fifth focus position may be sequentially located.

The frequency filter may include a first band pass filter and a second band pass filter. The calculator may output the first and second focus values using the first band pass filter, and output a fourth focus value using the second band pass filter when the lens is located at the third focus position.

Another exemplary embodiment of the invention provides a method for adjusting a focus of a lens including: determining focus values corresponding to focus positions of the lens; and determining whether the lens is located at an in-focus position, based on the focus values. The determining of the focus values includes: acquiring a first focus value by passing an image signal through a frequency filter, the image signal being acquired when the lens is located at a first focus position; acquiring a second focus value by passing an image signal through the frequency filter, the image signal being acquired when the lens is located at a second focus position different from the first focus position; and estimating a third focus value corresponding to a third focus position adjacent to the first and second focus positions, based on the first and second focus values.

The first focus position, the third focus position, and the second focus position may be sequentially located.

The method may further include estimating a fourth focus value corresponding to a fourth focus position, based on the third focus value and the second focus value. The first focus position, the third focus position, the second focus position, and the fourth focus position may be sequentially located.

The frequency filter may include a first band pass filter and a second band pass filter, and the first and second focus values may be acquired through the first band pass filter. The method may further include acquiring a fourth focus value using the second band pass filter when the lens is located at the third focus position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
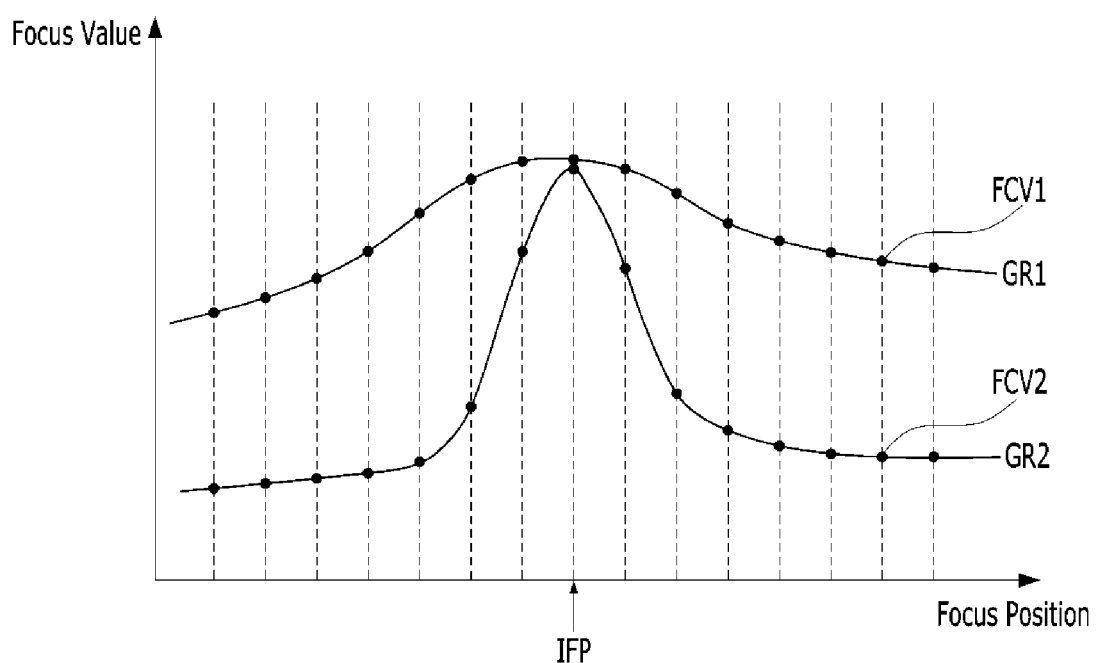
FIG. 1 is a graph illustrating focus values which are acquired as the focus position of a lens is changed.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a graph illustrating focus values which are acquired as the focus position of a lens is changed.

Referring to FIG. 1, focus values FCV1 and FCV2 may be changed according to the focus position of the lens. The focus value may indicate a signal value for a specific frequency band of an image signal acquired from light having passed through the lens. When the image signal has a high contrast level, it may indicate that the image signal has high energy in a properly selected frequency band. At this time, the image signal may have a high focus value. Therefore, the focus position of the lens when the focus value is high may be an in-focus (just focus) position IFP.

In order to more rapidly and/or accurately find the in-focus position IFP, a plurality of band pass filters may be used. For convenience of description, assume that two band pass filters are used. The first focus values FCV1 may be acquired by passing image signals, which are acquired by changing the focus position of the lens, through a first band pass filter and performing an appropriate calculation. It may be understood that the first focus values FCV1 are located on a first graph GR1. Because the focus positions are so dense that more first focus values FCV1 are acquired, data may be provided in a similar shape to the first graph GR1. The second focus values FCV2 may be acquired by passing the same image signals through a second band pass filter and performing the same calculation. It may be understood that the second focus values FCV2 are located on a second graph GR2.

The first and second graphs GR1 and GR2 may be referred to in various manners, and used for finding the in-focus position IFP. The lens is controlled to move to a focus position where each of the first and second graphs GR1 and GR2 has a peak value, i.e., the in-focus position IFP. In some exemplary embodiments, the lens may be moved while the respective slopes of the first and second graphs GR1 and GR2 are referred to. For example, the first graph GR1 has a slope that gradually increases or decreases, but the second graph GR2 has a relatively gentle slope when the lens is away from the in-focus position IFP, and a relatively steep slope when the lens is close to the in-focus position IFP. For example, the first graph GR1 may include focus values acquired through a low-pass filter, and the second graph GR2 may include focus values acquired through a high-pass filter. Therefore, when the second graph GR2 has a relatively gentle slope, the focus position of the lens may be adjusted by mainly referring to the first graph GR1. Furthermore, when the second graph GR2 has a relatively steep slope, the focus position of the lens may be adjusted by mainly referring to the second graph GR2. In some exemplary embodiments, since the values of the first and second graphs GR1 and GR2 (the focus values) for each focus position are different from each other, the lens may be moved while such a difference is referred to.

Figure 2:
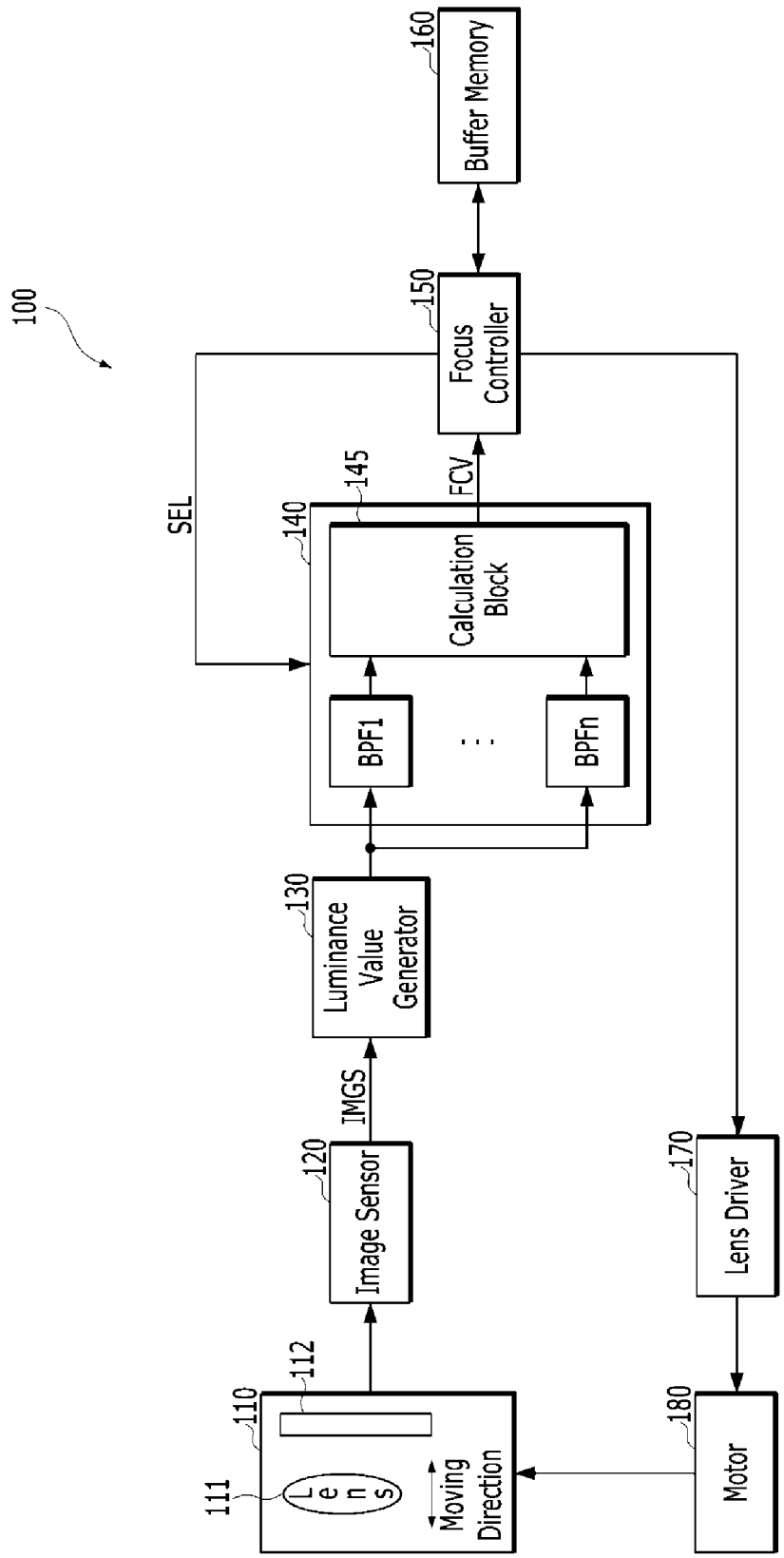
FIG. 2 is a block diagram illustrating an image capturing device in accordance with an exemplary embodiment of the invention.

FIG. 2 is a block diagram illustrating an image capturing device in accordance with an exemplary embodiment of the invention.

Referring to FIG. 2, the image capturing device 100 may include a lens unit 110, an image sensor 120, a luminance value generator 130, a focus value calculator 140, a focus controller 150, a buffer memory 160, a lens driver 170, and a motor 180.

The lens unit 110 includes one or more lenses and an imaging unit 112. The lenses pass light from an object such that an image is focused on the imaging unit 112. The lenses include a focus lens 111 to focus the light from the object on the imaging unit 112. When the focus position of the focus lens 111 is adjusted, an image is focused on the imaging unit 112. For example, as the distance between the focus lens 111 and the imaging unit 112 is adjusted by the motor 180, the image focused on the imaging unit 112 may be changed. The lens driver 170 may control the motor 180 to change the focus position of the focus lens 111.

The image sensor 120 senses light having reached the imaging unit 112 and generates an image signal IMGS. In some exemplary embodiments, the image sensor 120 may be a CCD (Charge Coupled Device) image sensor or a CMOS (Complementary Metal Oxide Semi-Conductor) image sensor, but the inventive concepts are not limited thereto.

The luminance value generator 130 is configured to extract the luminance value (or contrast level) of the image signal IMGS, and output the extracted luminance value to the focus value calculator 140. In some exemplary embodiments, the luminance value of a partial region of the image signal IMGS may be extracted. The partial region of the image signal IMGS indicates a region which is used to detect the in-focus position. That is, the image capturing device 100 may focus on a partial region of a captured image, and such a partial region may be changed. For example, the image capturing device 100 may preferentially focus on a partial region corresponding to the center of the captured image, and the partial region may be changed according to a user's selection. As the image capturing device 100 focuses on the partial region of the image signal IMGS, the amount of calculation required for performing the AF function may be reduced while the operating speed is improved.

The focus value calculator 140 includes a plurality of band pass filters BPF1 to BPFn and a calculation block 145. Each of the first to $n^{th}$ band pass filters BPF1 to BPFn is configured to filter the image signal IMGS having passed through the luminance value generator 130 in a frequency region. The first to $n^{th}$ band pass filters BPF1 to BPFn may have different filter properties, if necessary, and the number of the first to $n^{th}$ band pass filters BPF1 to BPFn may vary. The pass bandwidths and −3 dB values of the first to $n^{th}$ band pass filters BPF1 to BPFn may be properly modified, if necessary.

The calculation block 145 performs an operation on the outputs of the first to $n^{th}$ band pass filters BPF1 to BPFn, and provides a focus value FCV. The outputs of the band pass filters may be calculated in various manners. For example, the focus value FCV may include the sum data of the outputs of the band pass filters. The focus value FCV may include the peak data of the outputs of the band pass filters.

The focus controller 150 may store the focus value FCV received from the focus value calculator 140 in the buffer memory 160.

If the image signal IMGS acquired when the focus lens 111 is located at a specific focus position is passed through all of the first to $n^{th}$ band pass filters BPF1 to BPFn and focus values are provided through calculations performed on outputs of the first to $n^{th}$ band pass filters BPF1 to BPFn, the image capturing device 100 may consume a relatively large number of resources to perform such operations or calculations. Alternatively, depending on the resources included in the image capturing device 100, it may take a relatively long time to complete the operations or calculations.

In accordance with the inventive concepts, the focus value calculator 140 passes the image signal IMGS having passed through the luminance value generator 130 through a band pass filter selected among the first to $n^{th}$ band pass filters BPF1 to BPFn, and the calculation block 145 performs an operation on the output of the selected band pass filter and outputs the focus value FCV. In some exemplary embodiments, the focus controller 150 may transmit a select signal SEL to the focus value calculator 140, and the focus value calculator 140 may select a band pass filter in response to the select signal SEL. The band pass filter selected at the current focus position may not be selected at another focus position. The focus controller 150 may estimate a focus value corresponding to the corresponding band pass filter at the another focus position, based on the current focus position and the output focus value FCV. This configuration will be described in detail with reference to FIG. 3.

Through such processes, the focus values corresponding to the respective band pass filters BPF1 to BPFn at each of the focus positions may be determined and stored in the buffer memory 160. The determined focus values may be used to find the in-focus position IFP, as described with reference to FIG. 1. The focus controller 150 may control the lens driver 170 to adjust the focus position of the focus lens 111, using at least some of the determined focus values.

In some exemplary embodiments, the luminance value generator 130, the focus value calculator 140, and the focus controller 150 may be implemented through software, hardware, firmware, and combinations thereof, and included as components of one SOC (System-On-Chip).

Figure 3:
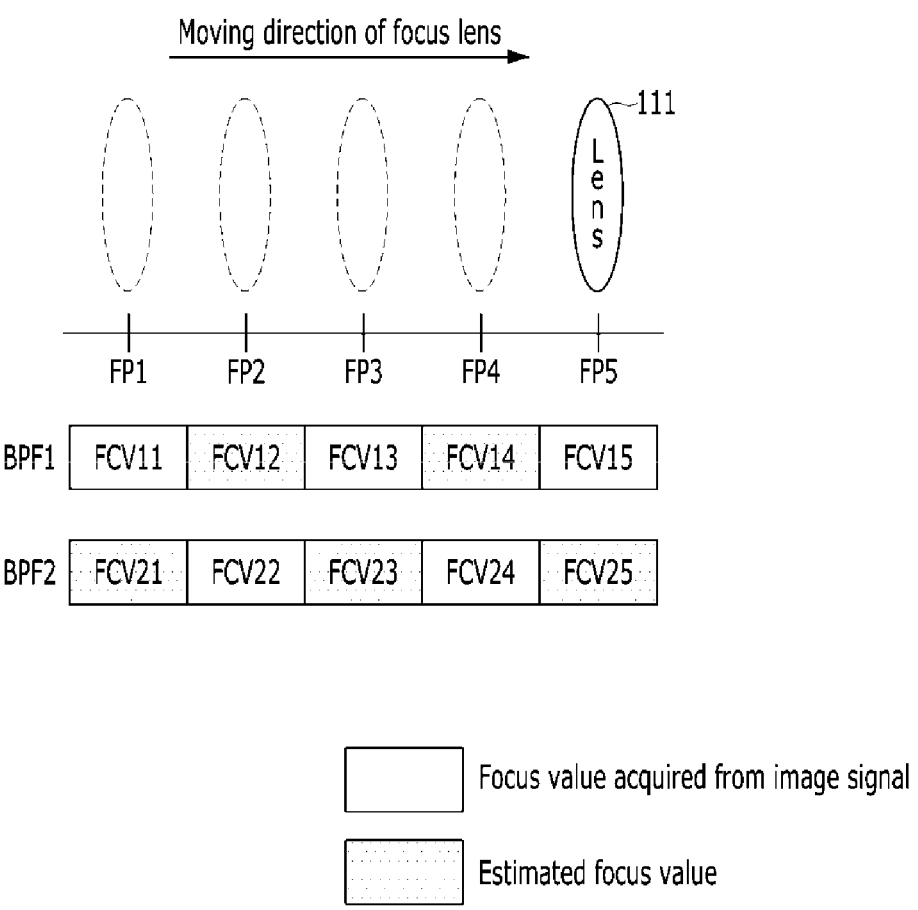
FIG. 3 is a diagram illustrating an exemplary embodiment in which focus values are acquired when the lens in accordance with the inventive concepts is located at respective focus positions.
Figure 4:
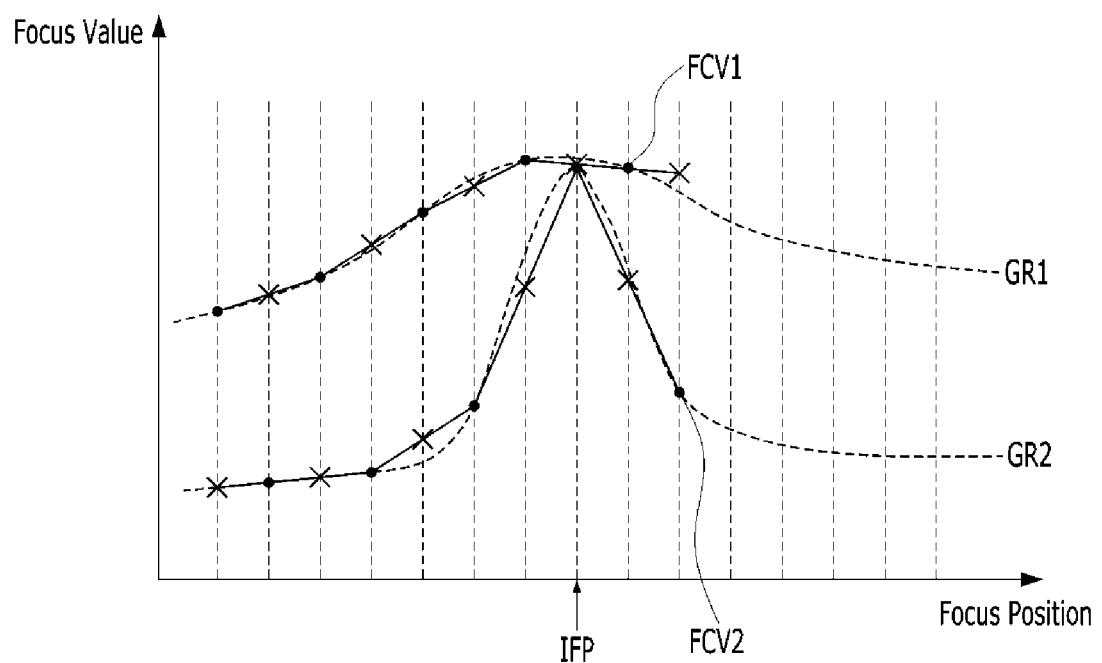
FIG. 4 is a graph illustrating the focus values acquired in accordance with an exemplary embodiment of the invention.

FIG. 3 is a diagram illustrating an exemplary embodiment in which focus values are acquired when the lens in accordance with the inventive concepts is located at each focus position. FIG. 4 is a graph illustrating the focus values which are acquired in accordance with the exemplary embodiment of the invention. In FIGS. 3 and 4, focus values corresponding to two band pass filters BPF1 and BPF2 are exemplified for convenience of description. However, the inventive concepts are not limited thereto. The image capturing device 100 may include more than two band pass filters, and focus values corresponding to the respective band pass filters when the focus lens 111 is located at each of the focus positions may be acquired or estimated from the image signal IMGS, as will be described with reference to FIG. 3 below.

Referring to FIGS. 2 and 3, the focus lens 111 is located at a first focus position FP1. The image signal IMGS captured by the image sensor 120 is provided to the focus value calculator 140 through the luminance value generator 130. The focus value calculator 140 may select the first band pass filter BPF1 in response to the select signal SEL from the focus controller 150, process the received image signal IMGS using the first band pass filter BPF1, and output a focus value FCV11. The focus controller 150 may store the output focus value FCV11 in the buffer memory 160.

The focus controller 150 may estimate a focus value FCV21 corresponding to the second band pass filter BPF2 at the first focus position FP1. For example, the focus controller 150 may estimate the focus value FCV21 by multiplying the focus value FCV11 by a first constant. The first constant may be experimentally determined and employed by the focus controller 150. The focus controller 150 may store the estimated focus value FCV21 in the buffer memory 160.

The focus lens 111 is located at a second focus position FP2. The focus controller 150 outputs the select signal SEL to select the second band pass filter BPF2. The focus value calculator 140 may select the second band pass filter BPF2 in response to the select signal SEL, process the image signal IMGS using the second band pass filter BPF2, and output a focus value FCV22. The focus controller 150 may store the output focus value FCV22 in the buffer memory 160.

The focus controller 150 may estimate a focus value FCV12 corresponding to the first band pass filter BPF1 at the second focus position FP2. For example, the focus controller 150 may estimate the focus value FCV12 by multiplying the focus value FCV22 by a second constant. The second constant may be experimentally determined and employed by the focus controller 150. The focus controller 150 may store the estimated focus value FCV12 in the buffer memory 160.

The focus lens 111 is located at a third focus position FP3. The first band pass filter BPF1 is selected by the select signal SEL. The focus value calculator 140 may process the image signal IMGS using the first band pass filter BPF1, and output a focus value FCV13. The focus controller 150 may store the output focus value FCV13 in the buffer memory 160.

The focus controller 150 may re-estimate the focus value FCV12 by referring to the focus values FCV11 and FCV13 which have been determined before and correspond to the focus positions FP1 and FP3 adjacent to the second focus position FP2. The focus controller 150 may correct the focus value FCV12 stored in the buffer memory 160 into the re-estimated focus value FCV12. The focus value FCV12 may be calculated based on the adjacent focus positions FP1 and FP3 and the focus values FCV11 and FCV13. For example, the focus value FCV12 may be calculated according to Equation 1 below.

$$FCVb - FCVt \arg et = \frac{(FCVb - FCVa)}{(FPb - FPa)} \times (FPb - FPt \arg et) \quad \text{[Equation 1]}$$

In Equation 1, FPa and FPb represent adjacent focus positions, FCVa and FCVb represent focus values of the adjacent focus positions, FCVtarget represents a focus value to be estimated, and FPtarget represents the focus position of the focus value to be estimated.

When FCVtarget is the focus value FCV12, FPa, and FPb are the focus positions FP1 and FP3, respectively, and FCVa and FCVb are the focus values FCV11 and FCV13, respectively. As such, the focus value FCV12 may be calculated according to a linear interpolation method using the focus values FCV11 and FCV13 of the adjacent focus positions FP1 and FP3 between which the corresponding focus position FP2 is located.

The focus controller 150 may estimate a focus value FCV23 corresponding to the second band pass filter BPF2 at the third focus position FP3. The focus controller 150 may re-estimate the focus value FCV23 by referring to the focus values FCV21 and FCV22 which have been determined before and correspond to the focus positions FP1 and FP2 adjacent to the third focus position FP3. The focus controller 150 may store the estimated focus value FCV23 in the buffer memory 160. The focus value FCV23 may be calculated based on the adjacent focus positions FP1 and FP2 and the focus values FCV21 and FCV22. For example, the focus value FCV23 may be calculated according to Equation 1 above.

In Equation 1, when FCVtarget is the focus value FCV23, FPa and FPb are the focus positions FP1 and FP2, respectively, and FCVa and FCVb are the focus values FCV21 and FCV22, respectively. As such, the focus value FCV23 may be calculated according to a linear extrapolation method using the focus values FCV21 and FCV22 of the adjacent focus positions FP1 and FP2 outside which the corresponding focus position FP3 is located.

The focus lens 111 is located at a fourth focus position FP4. The second band pass filter BPF2 is selected by the select signal SEL. The focus value calculator 140 may process the image signal IMGS using the second band pass filter BPF2, and output a focus value FCV24. The focus controller 150 may store the output focus value FCV24 in the buffer memory 160.

The focus controller 150 may re-estimate the focus value FCV23 by referring to the focus values FCV22 and FCV24 which have been determined before and correspond to the focus positions FP2 and FP4 adjacent to the third focus position FP3. The focus controller 150 may correct the focus value FCV23 stored in the buffer memory 160 into the re-estimated focus value FCV23. For example, the focus value FCV23 may be calculated according to the linear interpolation method using the focus values FCV22 and FCV24 of the adjacent focus positions FP2 and FP4 between which the third focus position FP3 is located.

The focus controller 150 may estimate a focus value FCV14 corresponding to the first band pass filter BPF1 at the fourth focus position FP4. For example, the focus value FCV14 may be calculated according to the linear extrapolation method using the focus values FCV12 and FCV13 of the adjacent focus positions FP2 and FP3 outside which the fourth focus position FP4 is located.

The focus lens 111 is located at the fifth focus position FP5. The first band pass filter BPF1 is selected by the select signal SEL. The focus value calculator 140 may process the image signal IMGS using the first band pass filter BPF1, and output a focus value FCV15. The focus controller 150 may store the output focus value FCV15 in the buffer memory 160.

The focus controller 150 may re-estimate the focus value FCV14 by referring to the focus values FCV13 and FCV15 which have been determined before and correspond to the focus positions FP3 and FP5 adjacent to the fourth focus position FP4. The focus controller 150 may correct the focus value FCV14 stored in the buffer memory 160 into the re-estimated focus value FCV14. For example, the focus value FCV14 may be calculated according to the linear interpolation method using the focus values FCV13 and FCV15 of the adjacent focus positions FP3 and FP5 between which the fourth focus position FP4 is located.

The focus controller 150 may estimate a focus value FCV25 corresponding to the second band pass filter BPF2 at the fifth focus position FP5. For example, the focus value FCV25 may be calculated according to the linear extrapolation method using the focus values FCV23 and FCV24 of the adjacent focus positions FP3 and FP4 outside which the fifth focus position FP5 is located.

As such, the image capturing device 100 processes the image signal IMGS using the band pass filter selected when the focus lens 111 is located at each of the focus positions, and thus decides the focus value corresponding to the selected band pass filter. Furthermore, the image capturing device 100 estimates the focus value, corresponding to the band pass filter which is not selected at the current focus position, from the focus value obtained while the image signal IMGS passes through the corresponding band pass filter at the previous focus position. Moreover, the image capturing device 100 may re-estimate and correct the focus value of the previous focus position corresponding to the selected band pass filter. Therefore, it is possible to reduce resources required for passing the image signal IMGS through a plurality of band pass filters and deciding focus values (for example, sum data or peak data) through operations performed on values outputted from the band pass filters. Furthermore, since the focus values corresponding to the plurality of band pass filters at each of the focus positions may be used to move the focus lens 111, the in-focus position can be rapidly found with high reliability. Therefore, it is possible to provide an image capturing device which can rapidly perform an AF function with high reliability, even while using reduced resources.

FIG. 4 is a graph illustrating the focus values which are acquired in accordance with exemplary embodiments of the invention.

FIG. 4 illustrates the focus values which are acquired as described with reference to FIGS. 2 and 3. While the focus lens 111 is moved, the first focus values FCV1 corresponding to the first band pass filter BPF1 and the second focus values FCV2 corresponding to the second band pass filter BPF2 are acquired. When the focus lens 111 reaches the in-focus position IFP or a similar position, the operations of acquiring the first focus values FCV1 and the second focus values FCV2 may be ended. As illustrated in FIG. 4, the first focus values FCV1 may be determined as similar values to dots of the first graph GR1, and the second focus values FCV2 may be determined as similar values to dots of the second graph GR2. That is, some of the first focus values FCV1 and some of the second focus values FCV2 are estimated values, but may have relatively high reliability.

Figure 5:
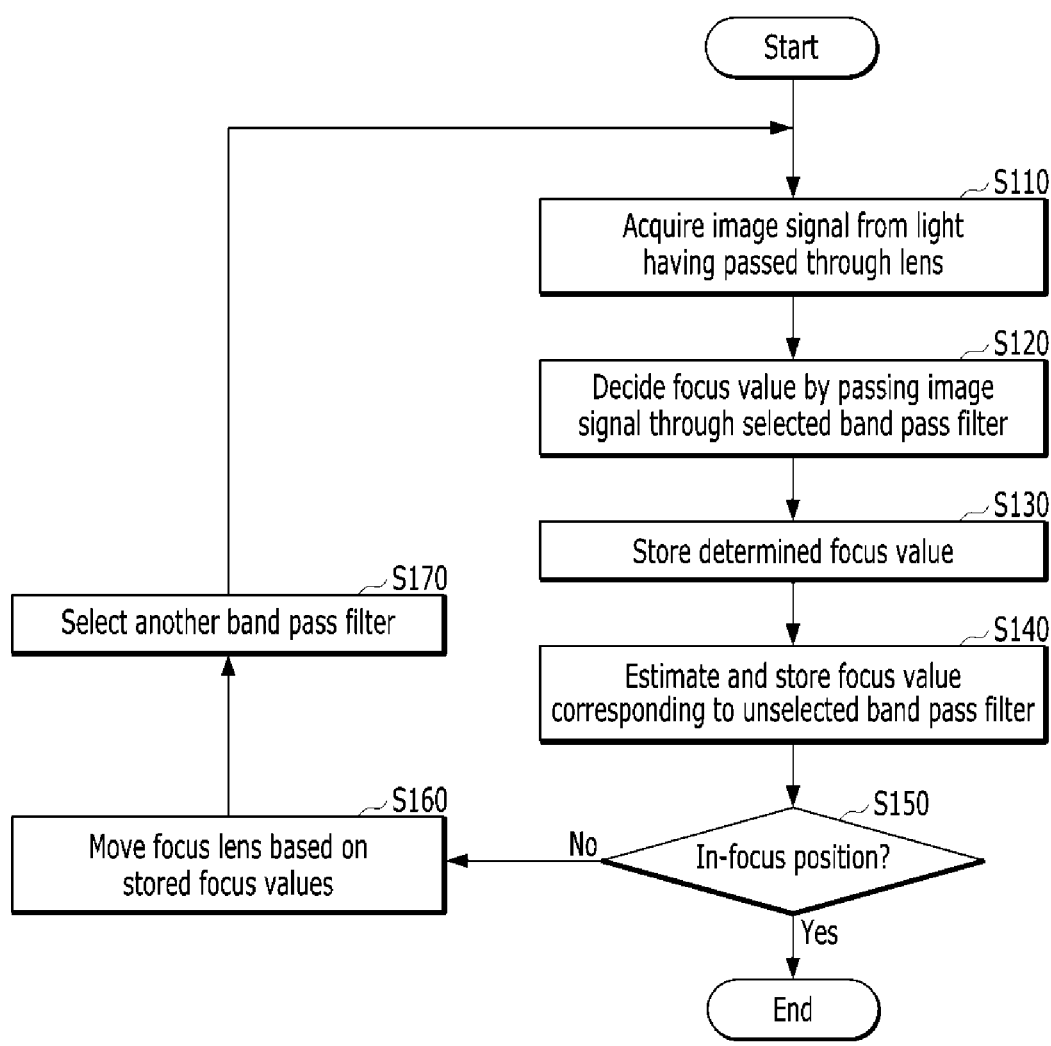
FIG. 5 is a flowchart illustrating a method for performing AF (Autofocus) in accordance with an exemplary embodiment of the invention.

FIG. 5 is a flowchart illustrating a method for performing AF in accordance with exemplary embodiments of the invention.

Referring to FIGS. 2 and 5, the image capturing device 100 acquires the image signal IMGS from light having passed through the lenses including the focus lens 111 located at a specific focus position in step S110. In step S120, the image capturing device 100 decides a focus value by passing the image signal IMGS through a selected band pass filter (for example, BPF1). In step S130, the image capturing device 100 stores the determined focus value in the buffer memory 160.

In step S140, the image capturing device 100 estimates a focus value corresponding to an unselected band pass filter (for example, BPF2) by referring to the focus value determined at the previous focus position in connection with the corresponding band pass filter. Furthermore, the image capturing device 100 may re-estimate the focus value which has been determined at the previous focus position and corresponds to the selected band pass filter, by referring to the focus value acquired from the image signal IMGS in step S130.

In step S150, the image capturing device 100 determines whether the focus lens 111 is located at the in-focus position. The image capturing device 100 may determine whether the focus lens 111 is located at the in-focus position, by referring to the focus values stored in the buffer memory 160. When the focus lens 111 is located at the in-focus position, the AF is completed. Otherwise, step S160 is performed.

In step S160, the image capturing device 100 moves the focus lens 111 based on the focus values stored in the buffer memory 160. In step S170, the image capturing device 100 selects another band pass filter (for example, BPF2). Then, step S110 is performed again.

Through such steps, the focus values (see FCV11 to FCV15 and FCV21 to FCV25 of FIG. 3) corresponding to the respective band pass filters may be accumulated in the buffer memory 160.

In accordance with exemplary embodiments of the invention, the image capturing device 100 processes the image signal IMGS using a band pass filter selected when the focus lens 111 is located at each of the focus positions, and thus, decides a focus value corresponding to the selected band pass filter. Furthermore, the image capturing device 100 estimates a focus value, corresponding to a band pass filter which is not selected at the current focus position, from the focus value obtained by passing the image signal IMGS through the corresponding band pass filter at the previous focus position. Furthermore, the image capturing device 100 may re-estimate and correct the focus value of the previous focus position corresponding to the selected band pass filter. Therefore, the image capturing device 100 can move the focus lens 111 using the focus values corresponding to the plurality of band pass filters at each of the focus positions, while resources required for passing the image signal IMGS through the plurality of band pass filters and deciding focus values through operations performed on values outputted from the plurality of band pass filters are reduced. Thus, the in-focus position can be rapidly found with high reliability. Therefore, it is possible to provide a method which can rapidly perform AF with high reliability, even while using reduced resources.

Figure 6:
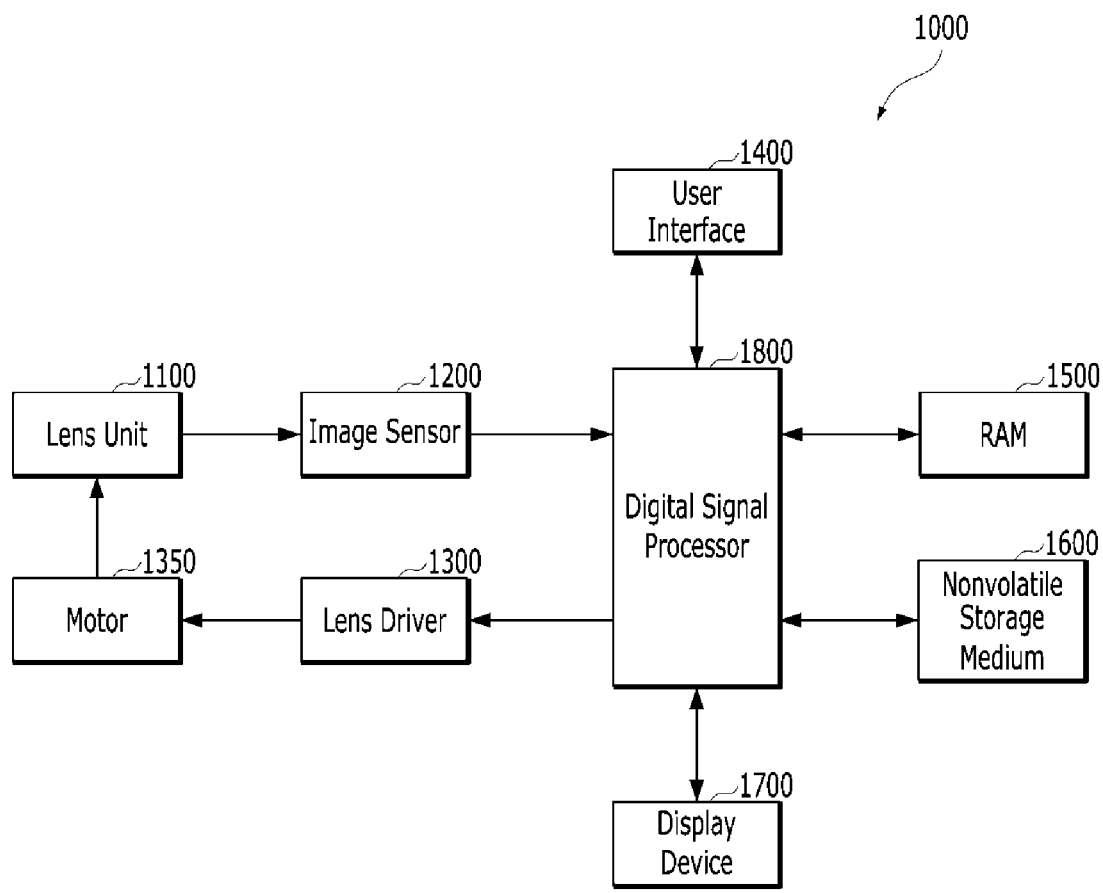
FIG. 6 is a block diagram illustrates an exemplary embodiment of a computer device including the image capturing device of FIG. 2.

FIG. 6 is a block diagram illustrates an exemplary embodiment of a computer device including the image capturing device of FIG. 2.

Referring to FIG. 6, the computer device 1000 includes a lens unit 1100, an image sensor 1200, a lens driver 1300, a motor 1350, a user interface 1400, a RAM 1500, a nonvolatile storage medium 1600, a display device 1700, and a digital signal processor 1800.

The lens unit 1100 receives light from an object. The image sensor 1200 converts the received light into an electrical signal. For example, the image sensor 1200 may generate an image signal by digitalizing the electrical signal with a proper gain. For example, the image sensor 1200 may include an analog-to-digital converter.

The lens driver 1300 is configured to control an operation of the motor 1350 in response to control of the digital signal processor 1800, and the motor 1350 is configured to drive the lens unit 1100. The lens unit 1100, the image sensor 1200, the lens driver 1300, and the motor 1350 may function as the lens unit 110, the image sensor 120, the lens driver 170, and the motor 180 which have been described with reference to FIG. 2.

The user interface 1400 senses a user input for controlling an operation of the computer device 1000, and generates an input command corresponding to the user input. The user interface 1400 may include an input device such as a key pad, a mouse, a finger scan sensor, a dome switch, a touch pad or a jog wheel, which can sense a command or information according to the user's operation.

The RAM 1500 may include one or more of various types of memories, such as an SRAM (Static RAM), a DRAM (Dynamic RAM) and an SDRAM (Synchronous DRAM). The RAM 1500 may be provided as a working memory or buffer memory of the digital signal processor 1800. FIG. 6 illustrates the RAM 1500 as a component distinguished from the digital signal processor 1800. However, this is merely an example, and at least a part of the RAM 1500 may be included in the digital signal processor 1800.

The nonvolatile storage medium 1600 may include various types of storage media which can retain data stored therein even though power is removed, for example, a flash memory and a hard disk.

The display device 1700 displays information processed by the computer device 1000 under control of the digital signal processor 1800.

The digital signal processor 1800 is configured to control overall operations of the computer device 1000. The digital signal processor 1800 may operate in response to an input command received through the user interface 1400, and process an image signal received through the image sensor 1200. The digital signal processor 1800 may perform the functions of the luminance value generator 130, the focus value calculator 140 and the focus controller 150 in FIG. 2. The digital signal processor 1800 may load commands or program codes to the RAM 1500, the commands or program codes causing the operations or steps described with reference to FIGS. 2 to 5. Then, the digital signal processor 1800 may execute the loaded commands or program codes. The program codes and the commands may be stored in the nonvolatile storage medium 1600.

In accordance with the inventive concepts, it is possible to provide an image capturing device capable of rapidly performing AF with high reliability, while using reduced resources.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An image capturing device comprising:
a lens;
a lens driver configured to change a focus position by moving the lens;
an image sensor configured to acquire an image signal from light having passed through the lens;
a calculator configured to output a focus value determined by passing the image signal from the image sensor through a plurality of frequency filters; and
a focus controller configured to control the lens driver to move the lens, based on focus values corresponding to focus positions of the lens,
wherein the calculator decides a focus value corresponding to a first band pass filter selected when the focus lens is located at a current focus position, among the plurality of frequency filters, and estimates a focus value corresponding to a second band pass filter which is not selected at the current focus position, based on the focus value corresponding to the first band pass filter at the current focus position.

2. The image capturing device of claim 1, wherein:
the calculator decides one or more focus values corresponding to the first band pass filter when the lens is positioned at one or more focus positions among the focus positions, and estimates a focus value corresponding to the first band pass filter of another focus position among the focus positions based on the one or more focus positions and the one or more focus values; and
the another focus position is adjacent to the one or more focus positions.

3. The image capturing device of claim 2, wherein:
the one or more focus positions comprise a first focus position and a second focus position, and the one or more focus values comprise a first focus value and a second focus value which correspond to the first and second focus positions, respectively; and
the focus controller estimates a third focus value corresponding to a third focus position among the focus positions, based on the first and second focus values.

4. The image capturing device of claim 3, wherein the first focus position, the third focus position, and the second focus position are sequentially located.

5. The image capturing device of claim 3, wherein:
the focus controller estimates a fourth focus value corresponding to a fourth focus position among the focus positions based on the third focus value and the second focus value, receives a fifth focus value from the calculator when the lens is located at a fifth focus position among the focus positions, and corrects the fourth focus value based on the second focus value and the fifth focus value; and
the first focus position, the third focus position, the second focus position, the fourth focus position, and the fifth focus position are sequentially located.

6. The image capturing device of claim 3, wherein:
each of the first and second focus values is determined through the first band pass filter; and
the focus controller receives a fourth focus value from the calculator, the fourth focus value being determined through the second band pass filter when the lens is located at the third focus position.

7. The image capturing device of claim 6, wherein the focus controller receives a fifth focus value from the calculator, the fifth focus value being determined through the second band pass filter when the lens is located at a fourth focus position, and estimates a sixth focus value corresponding to the second focus position based on the fourth and fifth focus values.

8. The image capturing device of claim 7, wherein the first focus position, the third focus position, the second focus position, and the fourth focus position are sequentially located.

9. An image capturing device to perform AF (Autofocus), comprising:
a lens;
a lens driver configured to change a focus position by moving the lens;
an image sensor configured to acquire an image signal from light having passed through the lens;
a calculator configured to output a focus value determined by passing the image signal from the image sensor through a frequency filter; and
a focus controller configured to control the lens driver to move the lens based on focus values corresponding to focus positions of the lens,
wherein:
the focus controller estimates a third focus value corresponding to a third focus position adjacent to a first focus position and a second focus position, based on a first focus value and a second focus value which are outputted from the calculator, when the lens is located at the first and second focus positions;
the first focus position, the third focus position, and the second focus position are sequentially located;
the focus controller estimates a fourth focus value corresponding to a fourth focus position, based on the third focus value and the second focus value;
the first focus position, the third focus position, the second focus position; and the fourth focus position are sequentially located;
the focus controller receives a fifth focus value from the calculator when the lens is located at a fifth focus position, and corrects the estimated fourth focus value based on the second and fifth focus values; and the first focus position, the third focus position, the second focus position, the fourth focus position, and the fifth focus position are sequentially located.

10. An image capturing device to perform AF (Autofocus), comprising:

a lens;

a lens driver configured to change a focus position by moving the lens;

an image sensor configured to acquire an image signal from light having passed through the lens;

a calculator configured to output a focus value determined by passing the image signal from the image sensor through a frequency filter; and a focus controller configured to control the lens driver to move the lens based on focus values corresponding to focus positions of the lens, wherein:

the focus controller estimates a third focus value corresponding to a third focus position adjacent to a first focus position and a second focus position, based on a first focus value and a second focus value which are outputted from the calculator, when the lens is located at the first and second focus positions;

the frequency filter comprises a first band pass filter and a second band pass filter; and the calculator outputs the first and second focus values using the first band pass filter, and outputs a fourth focus value using the second band pass filter when the lens is located at the third focus position.

11. A method for adjusting a focus of a lens, comprising:

determining focus values corresponding to focus positions of the lens; and determining whether the lens is located at an in-focus position, based on the focus values, wherein:

the determining of the focus values comprises:

acquiring a first focus value by passing an image signal through a frequency filter, the image signal being acquired when the lens is located at a first focus position;

acquiring a second focus value by passing an image signal through the frequency filter, the image signal being acquired when the lens is located at a second focus position different from the first focus position; and estimating a third focus value corresponding to a third focus position adjacent to the first and second focus positions, based on the first and second focus values;

the frequency filter comprises a first band pass filter and a second band pass filter;

the first and second focus values are acquired through the first band pass filter; and the method further comprises acquiring a fourth focus value using the second band pass filter when the lens is located at the third focus position.

12. The method of claim 11, wherein the first focus position, the third focus position, and the second focus position are sequentially located.

13. The method of claim 12, further comprising estimating a fourth focus value corresponding to a fourth focus position, based on the third focus value and the second focus value, wherein the first focus position, the third focus position, the second focus position and the fourth focus position are sequentially located.

* * * * *